US011669455B2

(12) United States Patent
Vijayrao et al.

(10) Patent No.: US 11,669,455 B2
(45) Date of Patent: Jun. 6, 2023

(54) SYSTEMS AND METHODS FOR PROFILING HOST-MANAGED DEVICE MEMORY

(71) Applicant: Meta Platforms, Inc., Menlo Park, CA (US)

(72) Inventors: Narsing Krishna Vijayrao, Santa Clara, CA (US); Christian Markus Petersen, Golden, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/308,322

(22) Filed: May 5, 2021

(65) Prior Publication Data

US 2022/0358041 A1 Nov. 10, 2022

(51) Int. Cl.
*G06F 12/0817* (2016.01)
(52) U.S. Cl.
CPC .... *G06F 12/0828* (2013.01); *G06F 2212/621* (2013.01)
(58) Field of Classification Search
CPC .... G06F 3/0647; G06F 3/061; G06F 12/0828; G06F 2212/621
See application file for complete search history.

(56) References Cited

U.S. PATENT DOCUMENTS

| 8,019,925 B1* | 9/2011 | Vogan | G06F 12/04 711/202 |
| 2015/0199126 A1 | 7/2015 | Jayasena et al. | |
| 2015/0278091 A1 | 10/2015 | Wilkerson et al. | |
| 2018/0260323 A1 | 9/2018 | John et al. | |
| 2018/0285256 A1* | 10/2018 | Oh | G06F 3/0644 |
| 2019/0050335 A1* | 2/2019 | Natu | G06F 12/0893 |
| 2020/0019336 A1 | 1/2020 | Kachare et al. | |
| 2020/0201573 A1 | 6/2020 | Kwak | |

OTHER PUBLICATIONS

Adavally S., et al., "Dynamically Adapting Page Migration Policies Based on Applications' Memory Access Behaviors," ACM Journal on Emerging Technologies In Computing Systems, vol. 17, No. 2, Article 16, Mar. 2021, 24 pages.
International Search Report and Written Opinion for International Application No. PCT/US2022/027383, dated Jul. 22, 2022, 14 pages.
Islam M., et al., "On-The-Fly Page Migration and Address Reconciliation for Heterogeneous Memory Systems," ACM Journal on Emerging Technologies in Computing Systems, vol. 16, No. 1, Article 10, Jan. 2020, 27 pages.

* cited by examiner

*Primary Examiner* — Baboucarr Faal
(74) *Attorney, Agent, or Firm* — Greenberg Traurig, LLP

(57) ABSTRACT

The disclosed computer-implemented method may include (1) receiving, at a storage device via a cache-coherent interconnect, a first request to access data at one or more host addresses of a coherent memory space of an external host processor, (2) updating, in response to the first request, one or more statistics associated with accessing the data at the one or more host addresses, (3) receiving, at the storage device via the cache-coherent interconnect, a second request to perform an operation associated with the one or more statistics, and (4) using the one or more statistics to perform the operation. Various other methods, systems, and computer-readable media are also disclosed.

20 Claims, 18 Drawing Sheets

SYSTEMS AND METHODS FOR PROFILING HOST-MANAGED DEVICE MEMORY

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
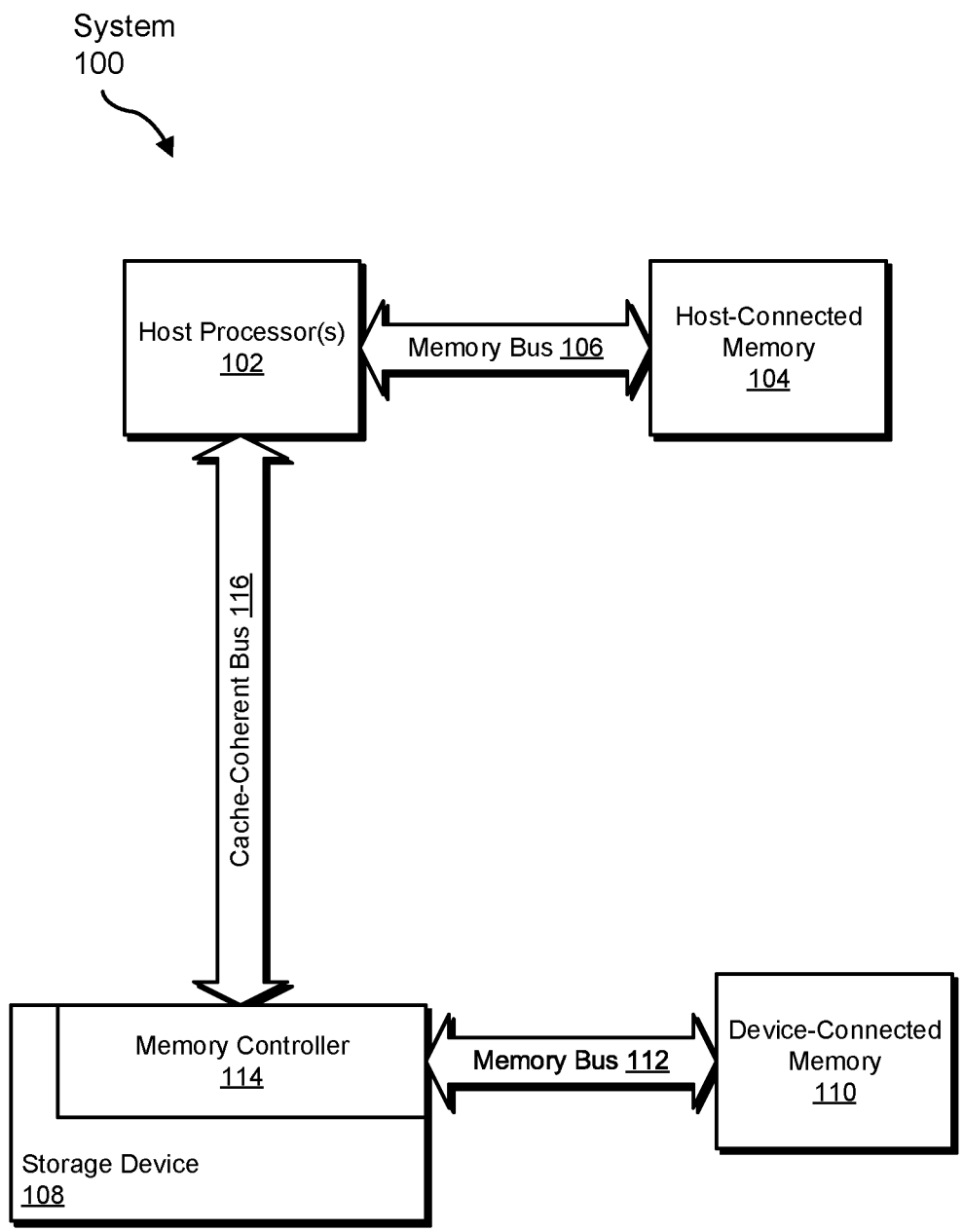
FIG. 1 is a block diagram of an exemplary coherent memory system having an exemplary storage device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The demand for handling complex computational and memory intensive workloads (such as those involved in Artificial Intelligence (AI), Machine Learning (ML), analytics, image processing, and video transcoding) is expanding at an ever-increasing rate. Computational and memory intensive workloads are increasingly performed by heterogeneous processing and memory systems that include general-purpose host processors, task-specific accelerators, and memory expanders.

For many computationally intensive and/or memory intensive workloads, it may be advantageous to coherently share and/or cache expandable memory resources between general-purpose host processors and/or task-specific accelerators via a chip-to-chip interconnect, external bus, or expansion bus. Within and/or across these memory resources, it may also be advantageous to store hot data (e.g., pages of memory that are most accessed, most recently accessed, and/or most likely to be accessed) in the memory resources' fastest regions and/or store cold data (e.g., pages of memory that are least accessed, less recently accessed, and/or least likely to be accessed) in the memory resources' slowest regions.

Conventionally, general-purpose host processors have been tasked with performing memory profiling, memory placement, and/or memory migration operations for their memory spaces. Unfortunately, conventional general-purpose host processors may be overwhelmed by and/or unable to effectively perform these tasks in systems with memory spaces large enough to handle the complex computational and memory intensive workloads described above. Accordingly, the instant disclosure identifies and addresses a need for additional and improved systems and methods for efficiently profiling and/or optimizing host-managed device memory.

This application is generally directed to storage devices (e.g., memory expanders, memory accelerators, and/or other types or forms of memory devices) that perform various profiling, placement, and/or migration operations on host-managed device memory. Embodiments of the present disclosure may profile read and write accesses to host-managed device memory and may calculate corresponding access statistics (e.g., on a per page basis). Embodiments of the present disclosure may track addresses accessed, types of accesses, times of accesses, and/or various other memory access characteristics and then perform calculations on this data to determine access statistics (e.g., access rates, latencies, etc.) for specific memory regions, pages, or address regions. The disclosed storage devices may provide an interface to external processors to query access statistics and/or may store the access statistics to host-managed device memory such that the external processors may access the statistics through direct memory reads.

By providing external host processors with access statistics, the systems and methods disclosed herein may enable the external host processors to make memory allocation or placement decisions without the computational burdens associated with generating the access statistics. In some embodiments, the systems and methods disclosed herein may manage memory migration or placement decisions and operations for external host processors. Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-5, detailed descriptions of exemplary coherent storage systems capable of profiling and optimizing host-managed device memory. The discussions corresponding to FIGS. 6-18 will provide detailed descriptions of corresponding methods.

FIG. 1 is a block diagram of an exemplary cache-coherent storage system 100. Cache-coherent storage system 100 may include one or more host processor(s) 102 (e.g., host central processing units (CPUs)) directly attached to a host-connected memory 104 via a memory bus 106 and a storage device 108 directly attached to a device-connected memory 110 via a memory bus 112. As shown, host processor(s) 102 and storage device 108 may be interconnected through a cache-coherent bus 116. In some embodiments, host processor(s) 102 may read and write data directly to host-connected memory 104 through memory bus 106 and indirectly to device-connected memory 110 through cache-coherent bus 116. Additionally or alternatively, storage device 108 may read and write data directly to device-connected memory 110 through memory bus 112 and indirectly to host-connected memory 104 through cache-coherent bus 116. In some embodiments, host processor(s) 102, storage system 108, and/or any number of additional devices within system 100 (e.g., storage device 302 shown in FIG. 3) may reference and/or access memory locations contained in host-connected memory 104 and device-connected memory 110 using a coherent memory space or address space (e.g., coherent memory space 710 illustrated in FIG. 7) that includes one or more host address ranges mapped to cacheable memory locations contained in host-connected memory 104 and/or one or more address ranges mapped to cacheable memory locations contained in device-connected memory 110. As shown in FIG. 1, storage device 108 may include a memory controller 114 for managing read and write operations to device-connected memory 110 and/or host-connected memory 104 that are made through cache-coherent bus 116.

Figure 2:
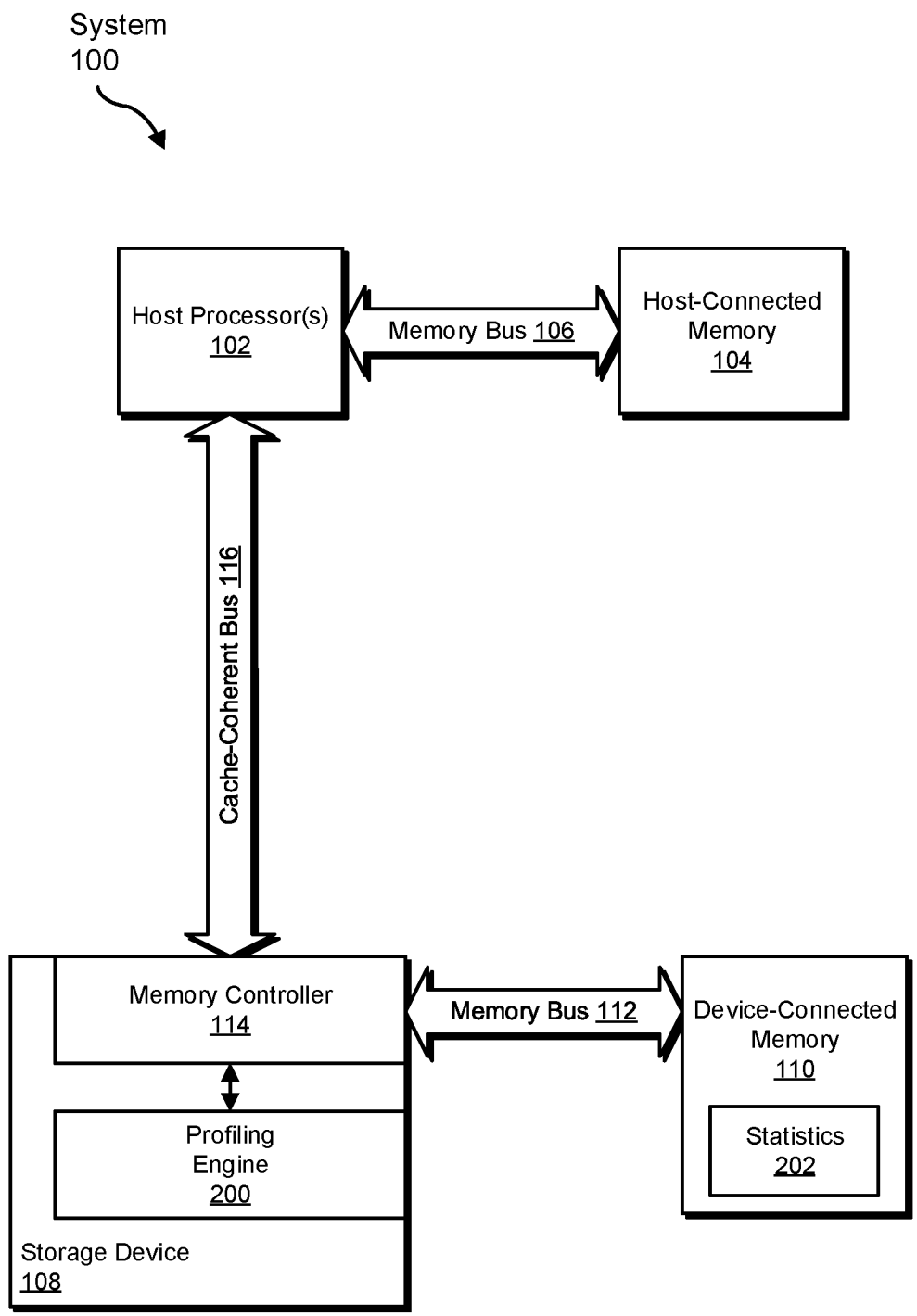
FIG. 2 is a block diagram of an exemplary coherent memory system including an exemplary storage device with an exemplary profiling engine.

In some embodiments, storage device 108 may include a profiling engine 200 (e.g., as shown in FIG. 2) capable of profiling accesses made to device-connected memory 110 via cache-coherent bus 116 and/or maintaining associated access statistics 202. Examples of profiling engine 200 include, without limitation, microprocessors, microcontrollers, Central Processing Units (CPUs), Digital signal processors (DSPs), Field-Programmable Gate Arrays (FPGAs), Application-Specific Integrated Circuits (ASICs), portions of one or more of the same, variations or combinations of one or more of the same, or any other suitable physical processor. In some embodiments, profiling engine 200 may store some or all of statistics 202 to private device memory not mapped to a host address space. Additionally or alternatively, profiling engine 200 may store some or all of statistics 202 to host-managed device memory mapped to and accessible via a host address space.

Figure 3:
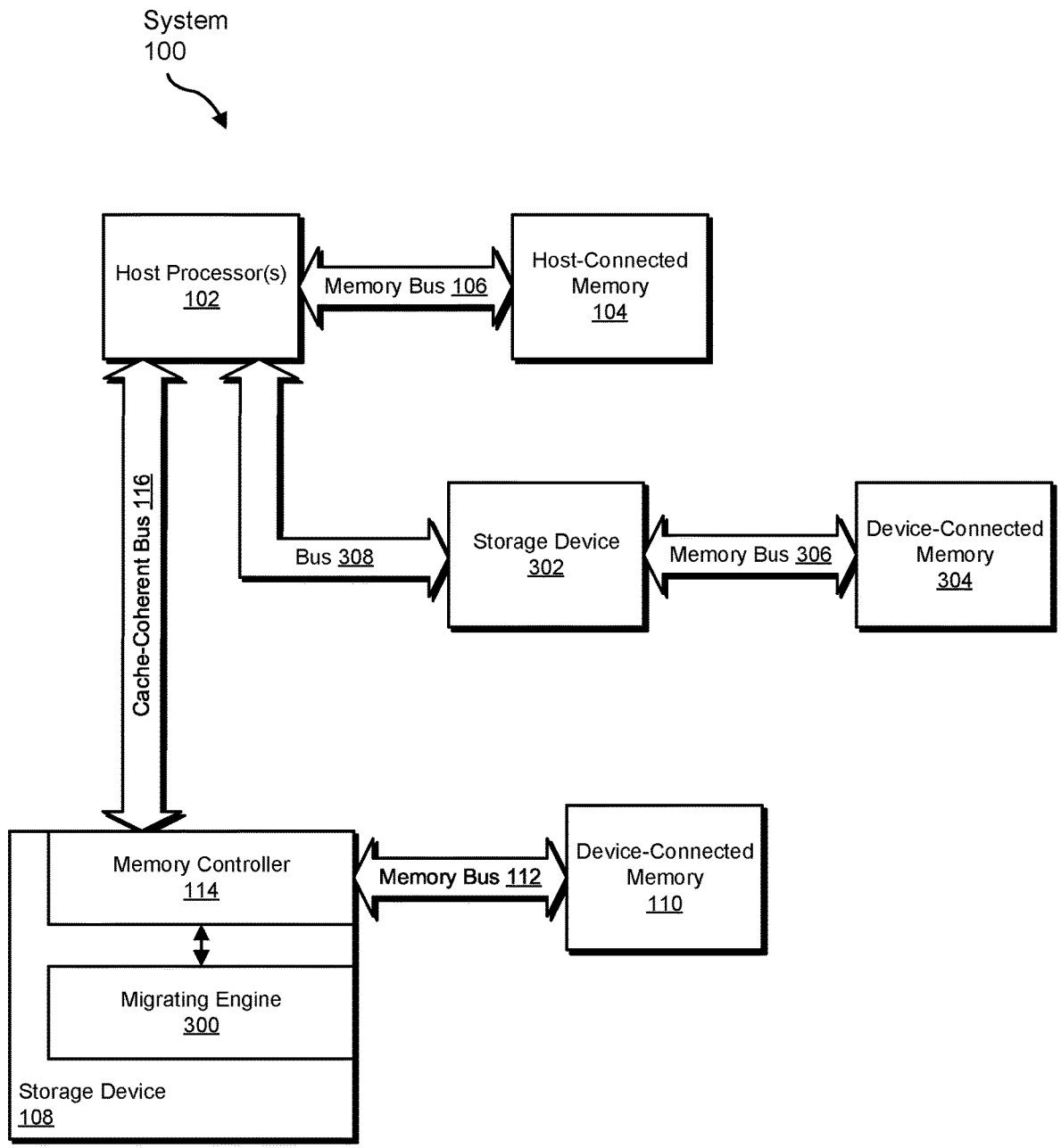
FIG. 3 is a block diagram of an exemplary coherent memory system including an exemplary storage device with an exemplary migrating engine.
Figure 18:
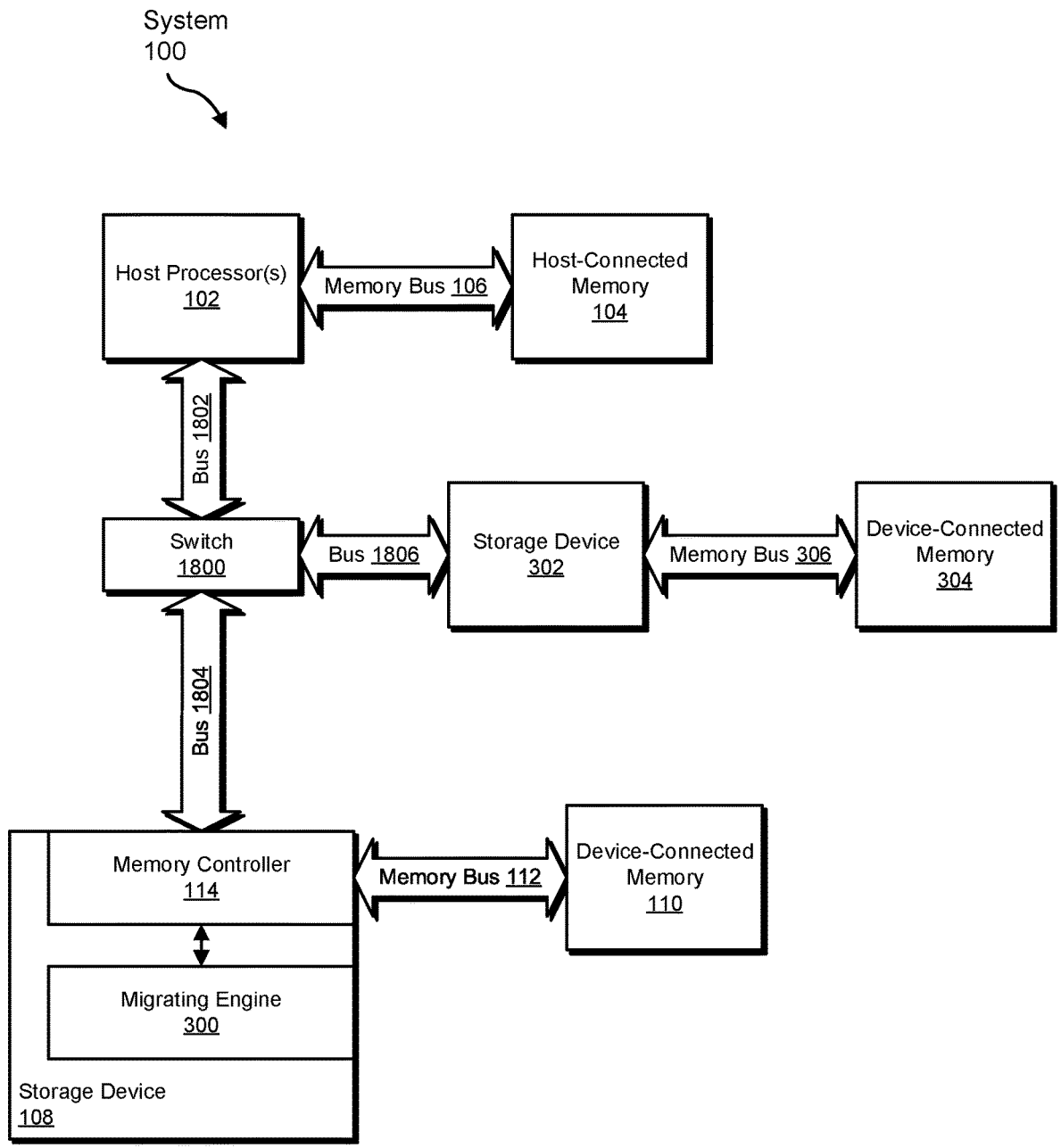
FIG. 18 is a block diagram of the components illustrated in FIG. 3 in an exemplary switched configuration.

In some embodiments, storage device 108 may include a migrating engine 300 (e.g., as shown in FIG. 3) capable of migrating data from one address (virtual or physical) to another address. In some examples, migrating engine 300 may migrate data stored to one region of device-connected memory 110 to another region of device-connected memory 110. In other examples, migrating engine 300 may migrate data from device-connected memory 110 to an external memory resource (e.g., host-connected memory 104 or device-connected memory 304) via cache-coherent bus 116. For example, as illustrated in FIG. 3, migrating engine 300 may migrate data from device-connected memory 110 to device-connected memory 304 via cache-coherent bus 116 and/or an additional cache-coherent bus 308. In other embodiments, migrating engine 300 may migrate data from device-connected memory 110 to device-connected memory 304 via a suitable switch without transmitting the data to host processor(s) 102. For example, as illustrated in FIG. 18, migrating engine 300 may migrate data from device-connected memory 110 to device-connected memory 304 via a switch 1800 and cache-coherent busses 1804 and 1806 without transmitting the data across a cache-coherent bus 1802 to host processor(s) 102. Examples of migrating engine 300 include, without limitation, microprocessors, microcontrollers, Central Processing Units (CPUs), Digital signal processors (DSPs), Field-Programmable Gate Arrays (FPGAs), Application-Specific Integrated Circuits (ASICs), portions of one or more of the same, variations or combinations of one or more of the same, or any other suitable physical processor.

Host-connected memory 104, device-connected memory 110, and/or device-connected memory 304 may represent any type or form of memory capable of storing cacheable data. Examples of host-connected memory 104, device-connected memory 110, and/or device-connected memory 304 include, without limitation, Dynamic Randomly Addressable Memory (DRAM), Static Randomly Addressable Memory (SRAM), High Bandwidth Memory (HBM), cache memory, volatile memory, non-volatile memory (e.g., Flash memory), or any other suitable form of computer memory. Memory bus 106, memory bus 112, and/or memory bus 306 may represent any internal memory bus suitable for interfacing with host-connected memory 104, device-connected memory 110, and/or device-connected memory 304. Examples of memory bus 106, memory bus 112, and/or memory bus 306 include, without limitation, Double Data Rate (DDR) buses (e.g., Low Power DDR buses), Serial ATA (SATA) buses, Serial Attached SCSI (SAS) buses, High Bandwidth Memory (HBM) buses, Peripheral Component Interconnect Express (PCIe) buses, and the like.

Cache-coherent bus 116 may represent any high-bandwidth and/or low-latency chip-to-chip interconnect, external bus, or expansion bus capable of hosting a providing connectivity (e.g., I/O, coherence, and/or memory semantics) between host processor(s) 102 and external devices or packages such as caching devices, workload accelerators (e.g., Graphics Processing Unit (GPU) devices, Field-Programmable Gate Array (FPGA) devices, Application-Specific Integrated Circuit (ASIC) devices, machine learning accelerators, tensor and vector processor units, etc.), memory expanders, and memory buffers. In some embodiments, cache-coherent bus 116 may represent a physical point-to-point bus interconnecting host processor(s) 102 to storage device 108. In other embodiments, cache-coherent bus 116 may represent multiple physical point-to-point buses interconnected via one or more switches (e.g., as illustrated in FIG. 18). In some embodiments, cache-coherent bus 116 may include a standardized interconnect (e.g., a Peripheral Component Interconnect Express (PCIe) bus), a proprietary interconnect, or some combination thereof. In at least one embodiment, cache-coherent bus 116 may include a Compute eXpress Link (CXL) interconnect such as those illustrated in FIGS. 4 and 5.

Figure 4:
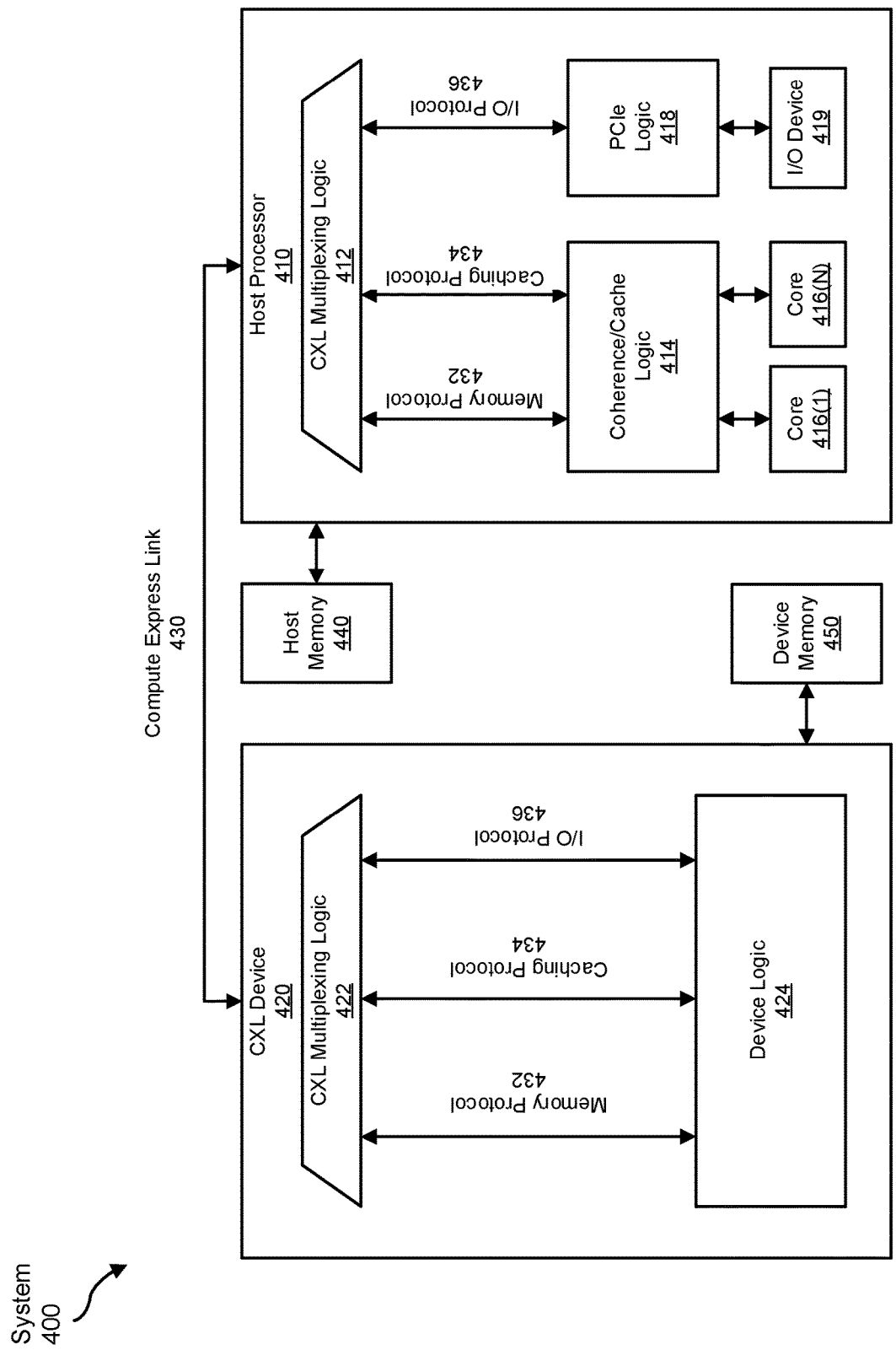
FIG. 4 is a block diagram of portions of an exemplary compute express link system.

Example system 100 in FIG. 1 may be implemented in a variety of ways. For example, all or a portion of example system 100 may represent portions of an example system 400 in FIG. 4. As shown in FIG. 4, system 400 may include a host processor 410 connected to a CXL device 420 via a compute express link 430. In some embodiments, host processor 410 may be directly connected to a host memory 440 via an internal memory bus, and CXL device 420 may be directly connected to a device memory 450 via an internal memory bus. In this example, the internal components of host processor 410 may communicate over compute express link 430 with the internal components of CXL device 440 using one or more CXL protocols (e.g., a memory protocol 432, a caching protocol 434, and/or an I/O protocol 436) that are multiplexed by multiplexing logic 412 and 422.

Figure 5:
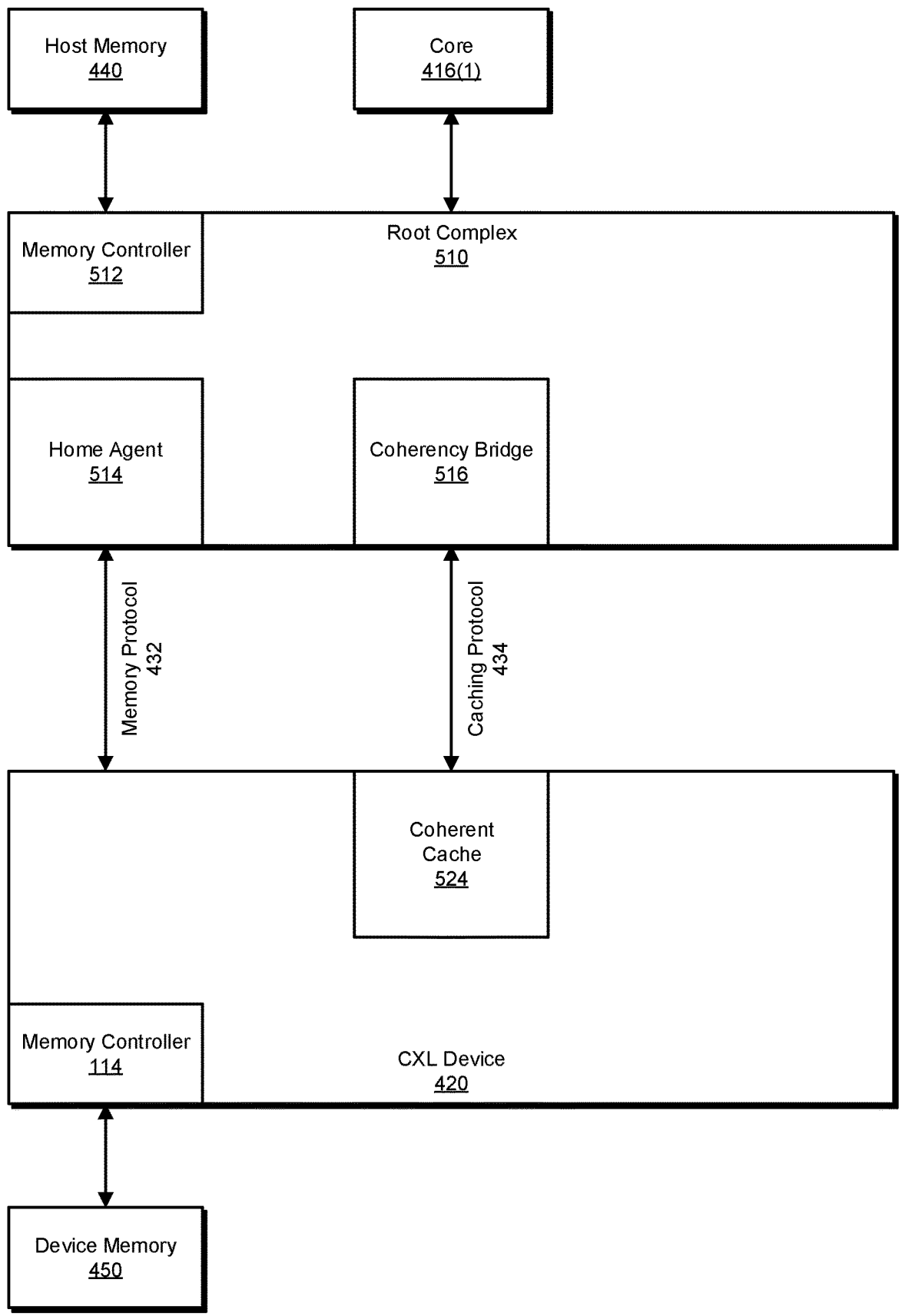
FIG. 5 is a block diagram of portions of an exemplary compute express link system.

As shown in FIG. 4, host processor 410 may include one or more processing core(s) 416 that are capable of accessing and caching data stored to host memory 440 and device memory 450 via coherence/cache logic 414. Host processor 410 may also include an I/O device 419 that is capable of communication over compute express link 430 via PCIe logic 418. As shown in FIG. 5, in some embodiments, host processor 410 may include a root complex 510 (e.g., a PCIe compatible root complex) that connects one or more of cores 416 to host memory 440 and device memory 450. In this example, root complex 510 may include a memory controller 512 for managing read and write operations to host memory 440, a home agent 514 for performing translations between physical, channel, and/or system memory addresses, and a coherency bridge 516 for resolving system wide coherency for a given host address. As shown in FIG. 4, CXL device 420 may include device logic 424 for performing memory and CXL protocol tasks. In some embodiments, device logic 424 may include one or more memory profiling and/or memory migrating engines, such as those described in connection with FIGS. 1-3, and memory controller 114 that manages read and write operations to device memory 450 (e.g., as shown in FIG. 5). In at least one embodiment, CXL device 420 may include a coherent cache 524 for caching host-managed data (e.g., data stored to host memory 440 or device memory 450).

Figure 6:
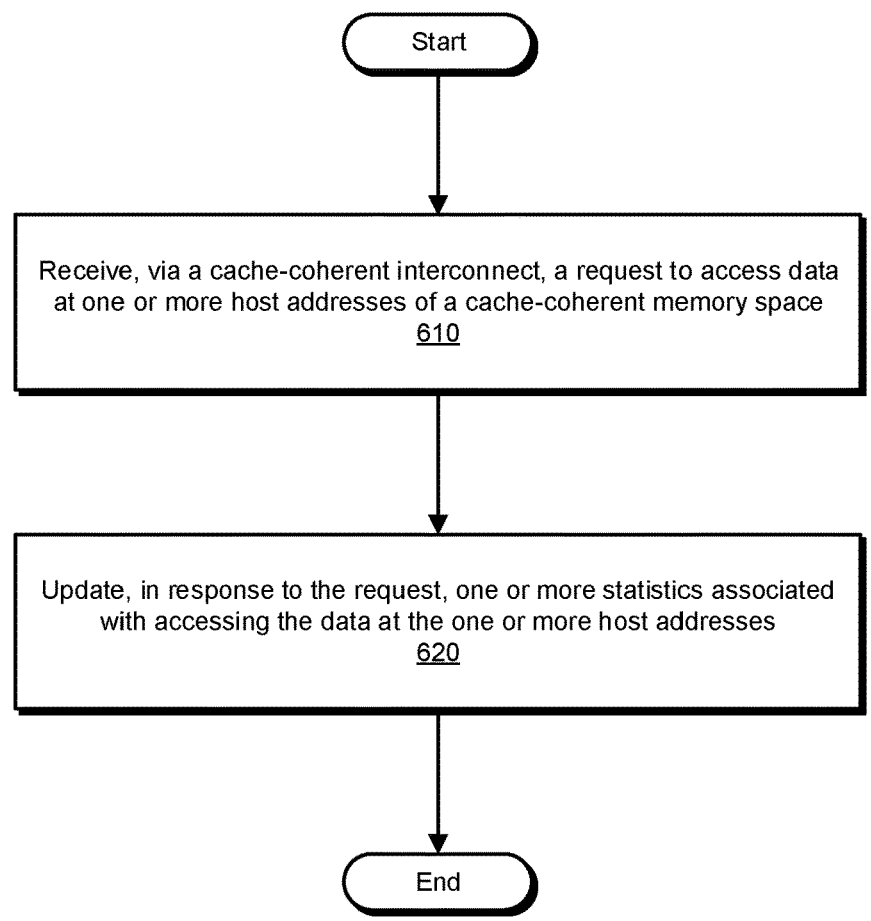
FIG. 6 is a flow diagram of an exemplary method for updating access statistics based on reads and/or writes to coherent host-managed device memory.

FIG. 6 is a flow diagram of an exemplary computer-implemented method 600 for profiling reads and writes to coherent host-managed device memory. The steps shown in FIG. 6 may be performed by any suitable computer-executable code and/or computing system, including the system(s) illustrated in FIGS. 1, 2, 3, 4, and 5. In one example, each of the steps shown in FIG. 6 may represent an algorithm whose structure includes and/or is represented by multiple sub-steps, examples of which will be provided in greater detail below.

As illustrated in FIG. 6, at step 610 one or more of the systems described herein may receive, via a cache-coherent interconnect, a request to access one or more host addresses of a shared coherent memory space. For example, storage device 108 may receive, from host processor(s) 102 via cache-coherent bus 116, a request to access a host address of a shared coherent memory space 710 of host processor(s) 102.

Figure 7:
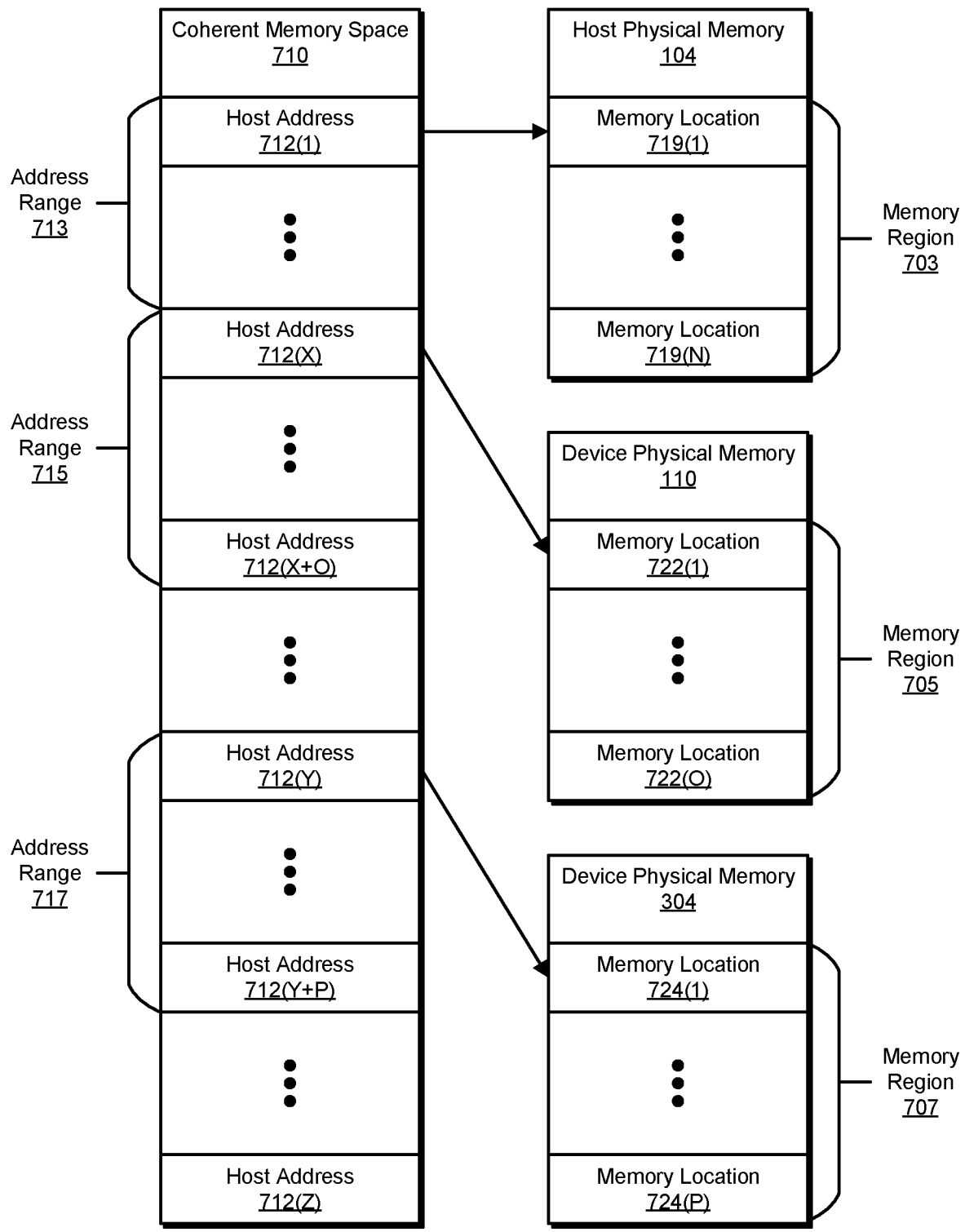
FIG. 7 is a block diagram of an exemplary coherent memory space and corresponding exemplary address mappings.

FIG. 7 illustrates an exemplary coherent memory space 710 having host addresses 712(1)-(Z) that have been mapped to physical memory locations of host physical memory 104, physical memory locations of device physical memory 110, and physical memory locations of device physical memory 304. As shown, host addresses in a memory range 713 of coherent memory space 710 may be mapped to memory locations 719(1)-(N) in a memory region 703 of host physical memory 104. Host addresses in a memory range 715 of coherent memory space 710 may be mapped to memory locations 722(1)-(O) in a memory region 705 of device physical memory 110. Host addresses in a memory range 717 of coherent memory space 710 may be mapped to memory locations 724(1)-(P) in a memory region 707 of device physical memory 304. In this example, host processors, accelerators, and/or storage devices that share access to coherent memory space 710 may read or write data to host physical memory 104 by accessing the host addresses in memory range 713. Similarly, host processors, accelerators, and/or storage devices that share access to coherent memory space 710 may read or write data to device physical memory 110 or 306 by accessing the host addresses in memory ranges 715 or 717, respectively. The memory locations and memory regions illustrated in FIG. 7 may represent any addressable quantity of memory (e.g., cache lines and/or pages of memory).

Returning to FIG. 6, at step 620, one or more of the systems described herein may update one or more statistics in response to the access requests received at step 610. For example, profiling engine 200 may, in response to a request to access host address 712(X) of coherent memory space 710, update one or more access statistics associated with host address 712(X), address range 715, memory location 722(1), memory region 705, and/or device physical memory 110.

In some embodiments, the disclosed systems may calculate and/or update access statistics based on one or more details associated with memory accesses. Thus, as part of updating access statistics, the disclosed systems may measure, track, and/or record various details of memory accesses as they are processed. For example, the disclosed systems may track host addresses accessed, physical addresses accessed, access types (e.g., read or write), access amounts, access durations, access orderings or sequences, access patterns, and/or request sequences. In some embodiments, the disclosed systems may record details identifying the devices, the processors, the threads, the applications, etc. from which access requests originate. In some embodiments, the disclosed systems may record details identifying what was accessed, details indicating how accesses were performed, and/or any other detail necessary or helpful in calculating the access statistics mentioned below. In some embodiments, the disclosed systems may record the above-described details in private device memory or host-managed device memory for later use in generating one or more access statistics.

The disclosed systems may generate a variety of access statistics at one or more levels of granularity. For example, the disclosed systems may generate read access rates, write access rates, read bandwidths, write bandwidths, read latencies, and/or write access latencies for individual host addresses, host-address ranges, physical addresses, physical-address ranges, cache lines, pages, memory components, and/or storage devices. In some embodiments, the disclosed systems may maintain summary statistics (e.g., means, medians, maximums, minimums, ranges, etc.) that summarize tracked details over a particular time period. In some embodiments, the disclosed systems may generate classification statistics. For example, the disclosed systems may generate classifications that indicate fast memory, slow memory, hot pages, cold pages, etc. In some embodiments, the disclosed systems may determine classifications by comparing other calculated statistics with a suitable threshold.

Figure 9:
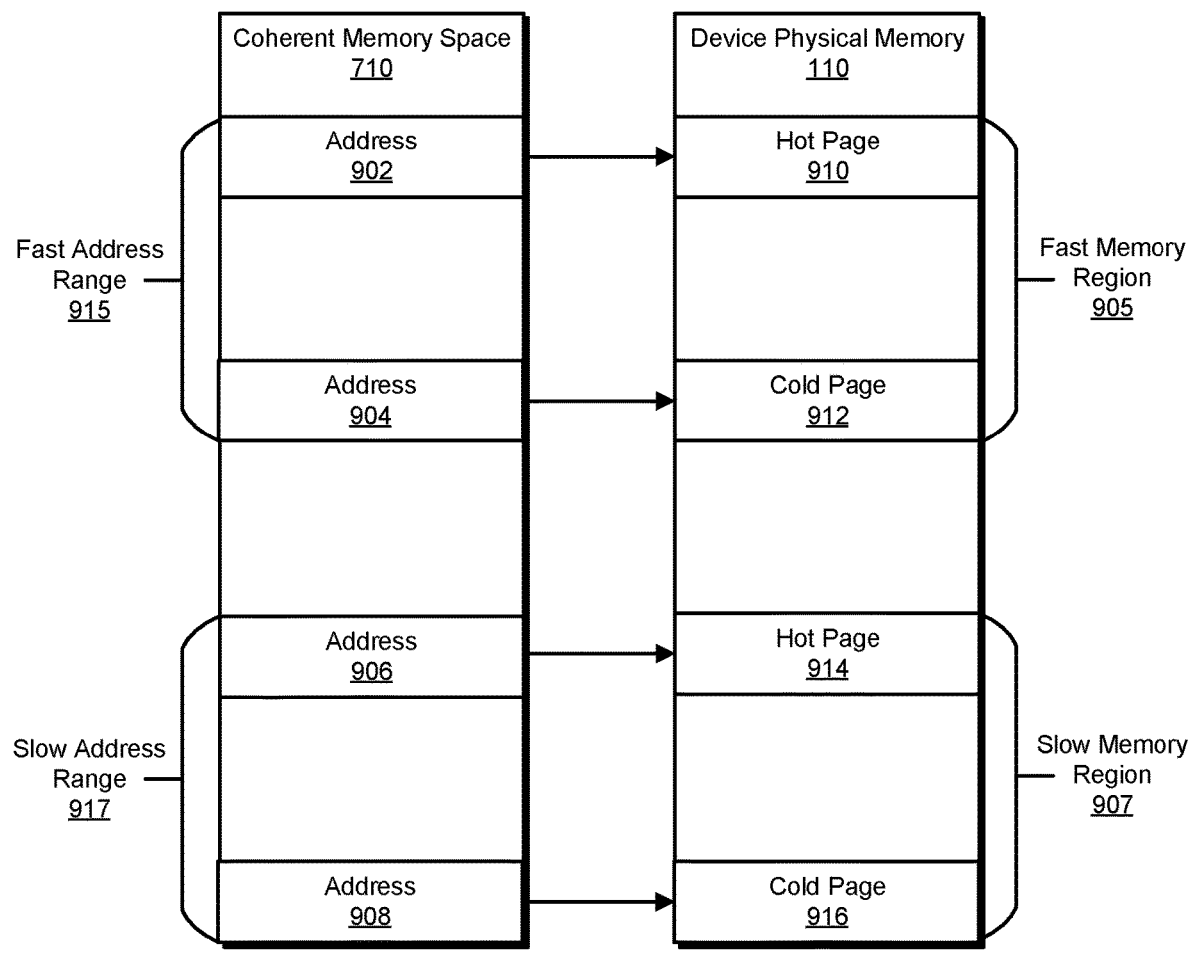
FIG. 9 is a block diagram of an exemplary profiled coherent memory space.
Figure 10:
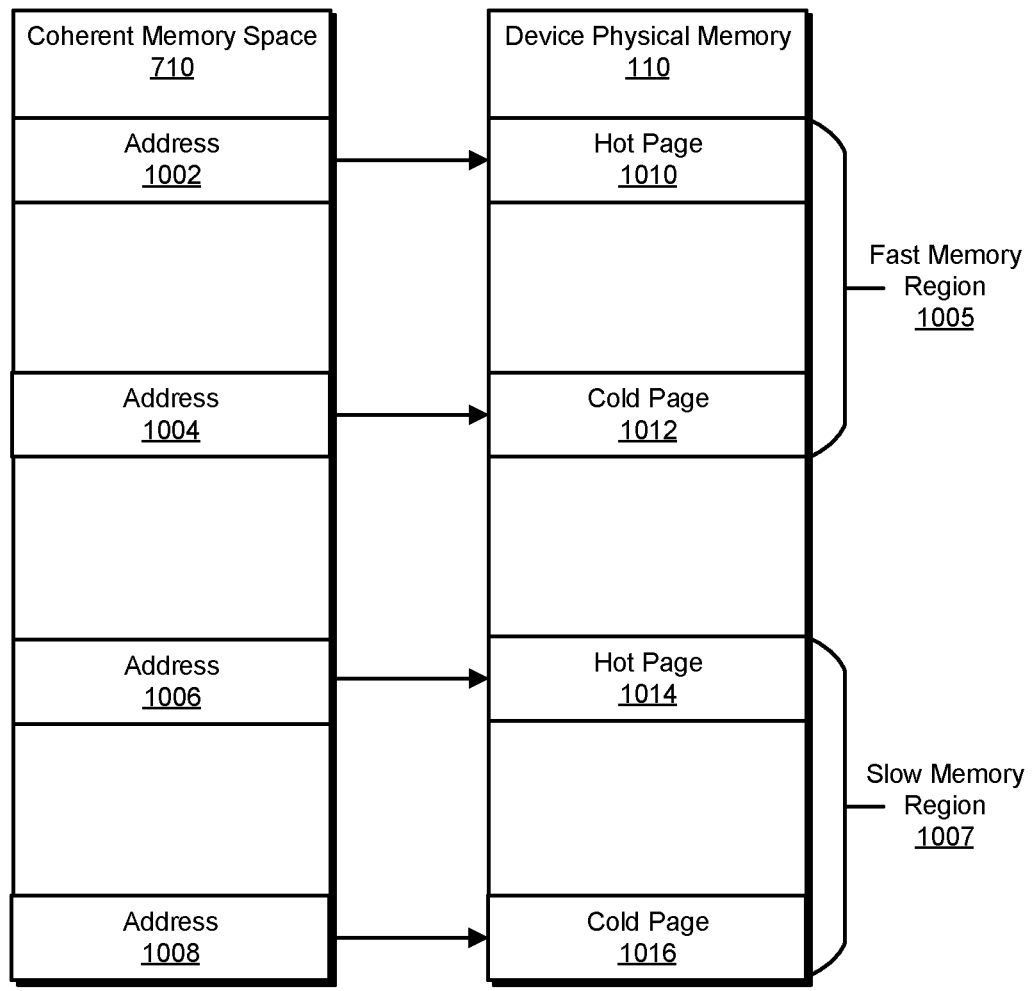
FIG. 10 is a block diagram of another exemplary profiled coherent memory space.
Figure 11:
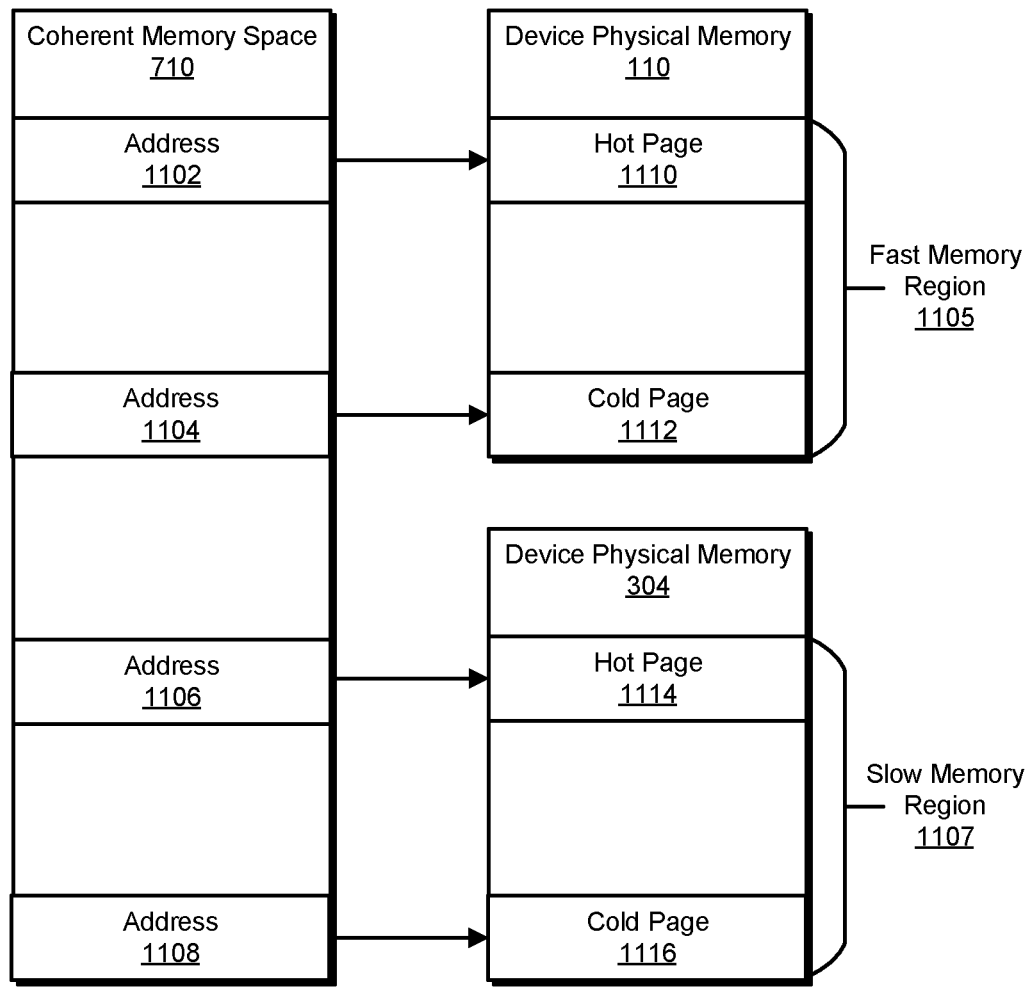
FIG. 11 is a block diagram of another exemplary profiled coherent memory space.

FIGS. 9-11 illustrate exemplary classification statistics. The disclosed systems may generate such exemplary classification statistics based on accesses to coherent memory space 710. As shown in FIG. 9, the disclosed systems may classify an address range 915 and an address range 917 of coherent memory space 710 as fast and slow, respectively. Similarly, the disclosed systems may classify memory range 905 and memory range 907 of device physical memory 110 as fast memory and slow memory, respectively. The disclosed systems may also classify pages 910 and 914 as hot pages and pages 912 and 916 as cold pages. As shown in FIG. 10, the disclosed systems may classify memory range 1005 and memory range 1007 of device physical memory 110 as fast memory and slow memory, respectively. The disclosed systems may also classify pages 1010 and 1014 as hot pages and pages 1012 and 1016 as cold pages. As shown in FIG. 11, the disclosed systems may classify memory range 1105 of device physical memory 110 and memory range 1107 of device physical memory 304 as fast memory and slow memory, respectively. The disclosed systems may also classify pages 1110 and 1114 as hot pages and pages 1112 and 1116 as cold pages.

Returning to FIG. 6, the disclosed systems may update access statistics at various times. In some embodiments, the disclosed systems may update an access statistic immediately when an access request is processed, once per sampling period, once per a certain number of accesses, and/or in response to receiving a request to perform an operation based on the statistic. In some embodiments, the disclosed systems may update access statistics based on each access processed. In other embodiments, the disclosed systems may update access statistics based on a sampling of accesses (e.g., a moving average of accesses over a particular window of time).

Figure 8:
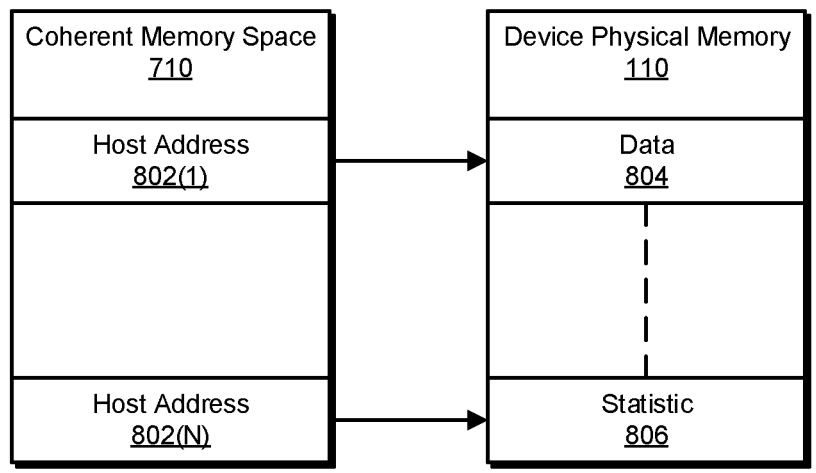
FIG. 8 is a block diagram of exemplary data and an exemplary access statistic accessible via an exemplary coherent memory space.

In some embodiments, the disclosed systems may store the above-described statistics in private device memory or host-managed device memory. For example, as shown in FIG. 8, the disclosed systems may write a statistic 806 associated with host address 802(1), data 804, and/or device physical memory 110 to a memory location within device physical memory 110 that is accessible to an external host processor using host address 802(N).

Figure 12:
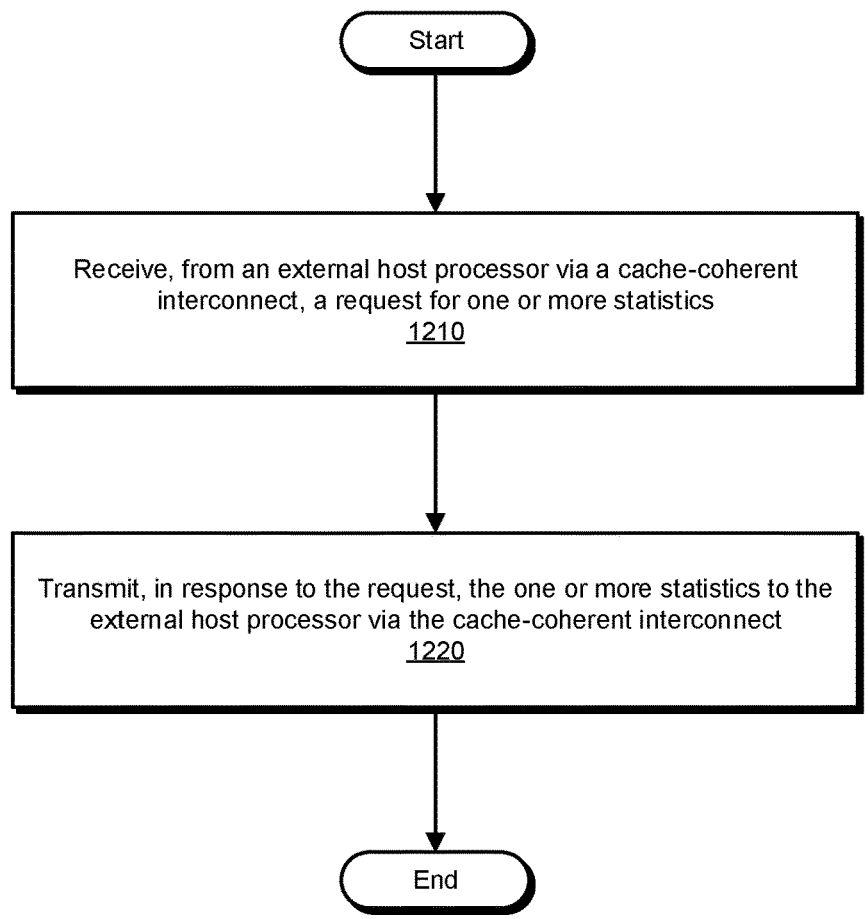
FIG. 12 is a flow diagram of an exemplary method for responding to requests for access statistics.

The disclosed systems may perform various operations for external host processors using access statistics as explained in greater detail below. FIG. 12 is a flow diagram of an exemplary computer-implemented method 1200 for responding to requests for access statistics. The steps shown in FIG. 12 may be performed by any suitable computer-executable code and/or computing system, including the system(s) illustrated in FIGS. 1, 2, 3, 4, and 5. In one example, each of the steps shown in FIG. 12 may represent an algorithm whose structure includes and/or is represented by multiple sub-steps, examples of which will be provided in greater detail below.

As illustrated in FIG. 12, at step 1210 one or more of the systems described herein may receive, from an external host processor via a cache-coherent interconnect, a request for one or more statistics. For example, storage device 108 may receive a request for an access statistic associated with device physical memory 100 from host processor(s) 102 via cache-coherent bus 116.

As mentioned above, the disclosed systems may make access statistics available to an external host processor by writing the statistics to the external host processor's address space (i.e., host-managed device memory). In these embodiments, the disclosed systems may receive requests for access statistics in the form of a request to read data from the host address to which the statistic was previously stored. In other embodiments, the disclosed systems may receive requests for access statistics in the form of statistic requests. In such embodiments, statistic requests may include a statistic type and an identifier of one or more addresses, regions, etc. for which statistics are requested.

At step 1220, one or more of the systems described herein may transmit, in response to the request received at step 1210, the one or more statistics to the external host processor via the cache-coherent interconnect. For example, storage device 108 may transmit one of statistics 202 to host processor(s) 102 via cache-coherent bus 116. In some examples, host processor(s) 102 may use these statistics to migrate data and/or to request a migration of data.

Figure 13:
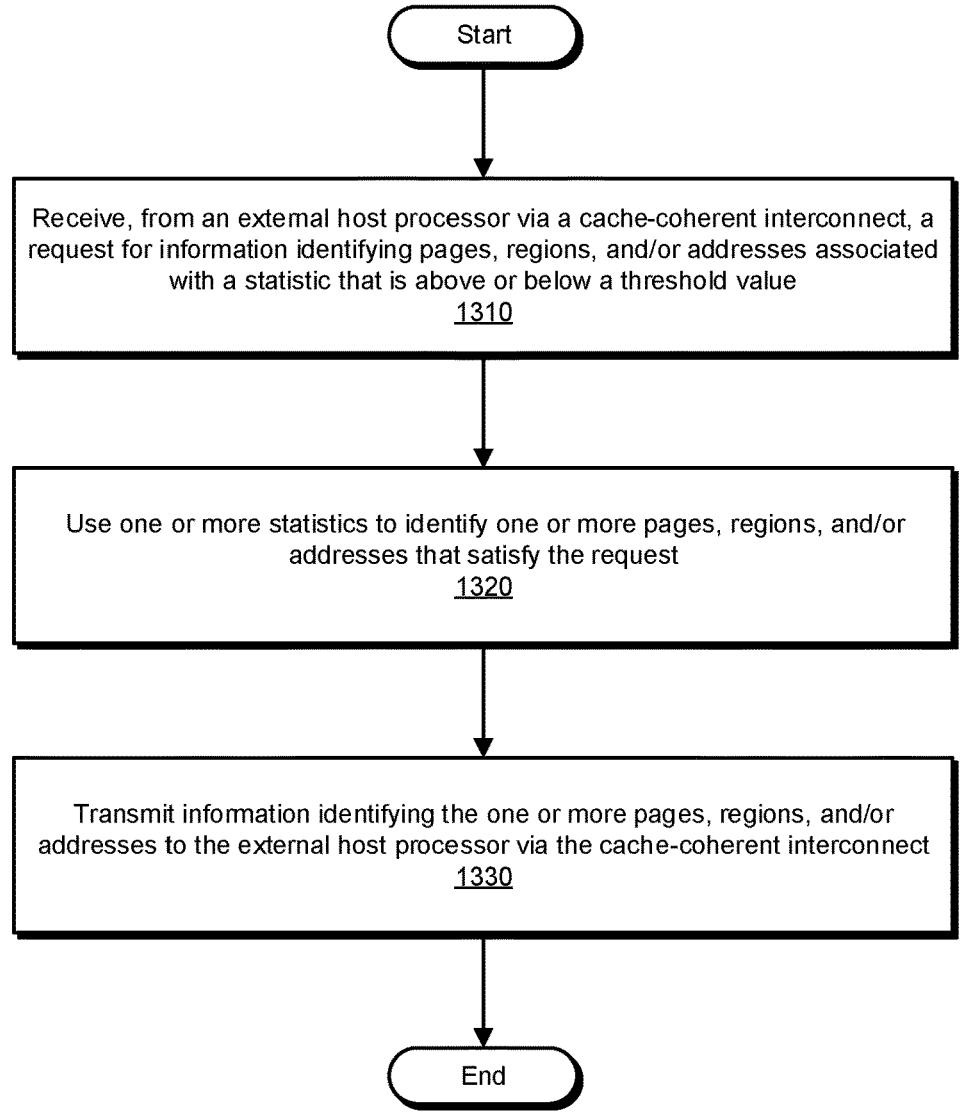
FIG. 13 is a flow diagram of another exemplary method for responding to requests for access statistics.

FIG. 13 is a flow diagram of another exemplary computer-implemented method 1300 for responding to requests for access statistics. The steps shown in FIG. 13 may be performed by any suitable computer-executable code and/or computing system, including the system(s) illustrated in FIGS. 1, 2, 3, 4, and 5. In one example, each of the steps shown in FIG. 13 may represent an algorithm whose structure includes and/or is represented by multiple sub-steps, examples of which will be provided in greater detail below.

As illustrated in FIG. 13, at step 1310 one or more of the systems described herein may receive, from an external host processor via a cache-coherent interconnect, a request for pages, regions, and/or addresses associated with a statistic that is above or below a threshold value. For example, storage device 108 may receive, from host processor(s) 102 via cache-coherent bus 116, a request for some or all of the hot/cold memory pages stored to device-connected memory 110, some or all of the fast/slow memory regions of device-connected memory 110, and/or some or all of the fast/slow host addresses of coherent memory space 710.

At step 1320, one or more of the systems described herein may use one or more statistics to identify one or more pages, regions, and/or addresses that satisfy the request received at step 1310. For example, storage device 108 may use statistics 202 to identify some or all of the hot/cold memory pages stored to device-connected memory 110, some or all of the fast/slow memory regions of device-connected memory 110, and/or some or all of the fast/slow host addresses of coherent memory space 710.

At step 1330, one or more of the systems described herein may transmit information (e.g., one or more host addresses and/or ranges) identifying the pages, regions, and/or host addresses identified in step 1320 to the external host processor via the cache-coherent interconnect. For example, storage device 108 may transmit, to host processor(s) 102 via cache-coherent bus 116, host addresses identifying some or all of the hot/cold memory pages stored to device-connected memory 110, some or all of the fast/slow memory regions of device-connected memory 110, and/or some or all of the fast/slow host addresses of coherent memory space 710. In some examples, host processor(s) 102 may use these statistics to migrate data and/or to request a migration of data.

Figure 14:
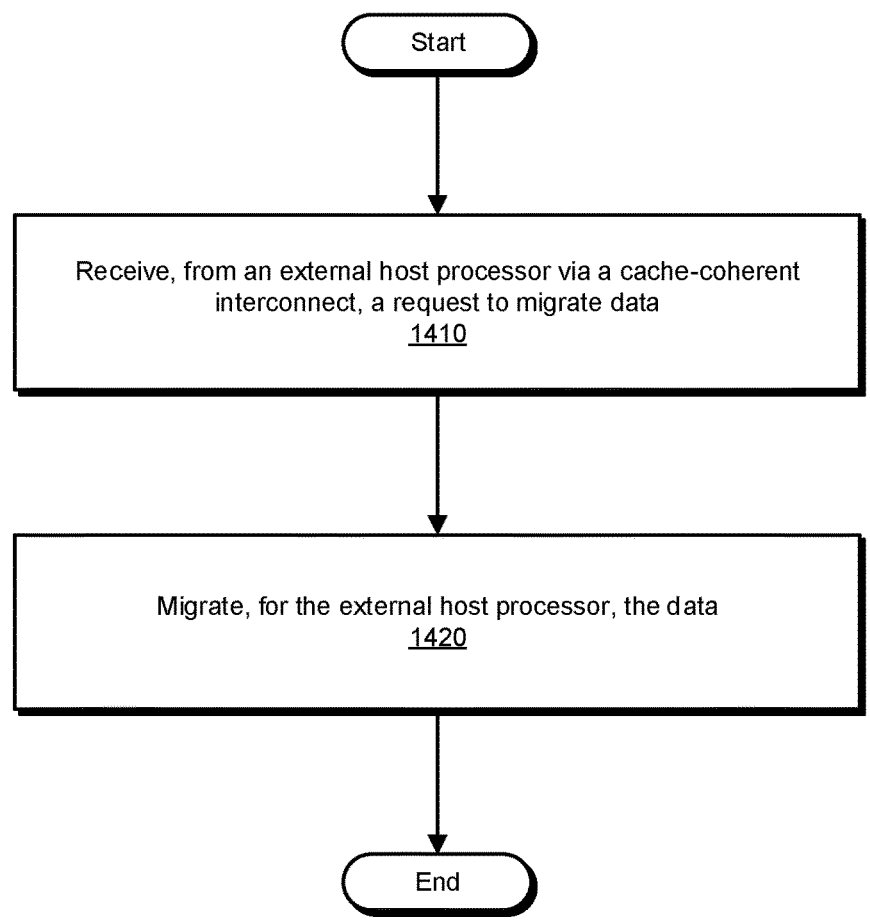
FIG. 14 is a flow diagram of an exemplary method for processing requests to migrate data within a coherent memory space.
Figure 15:
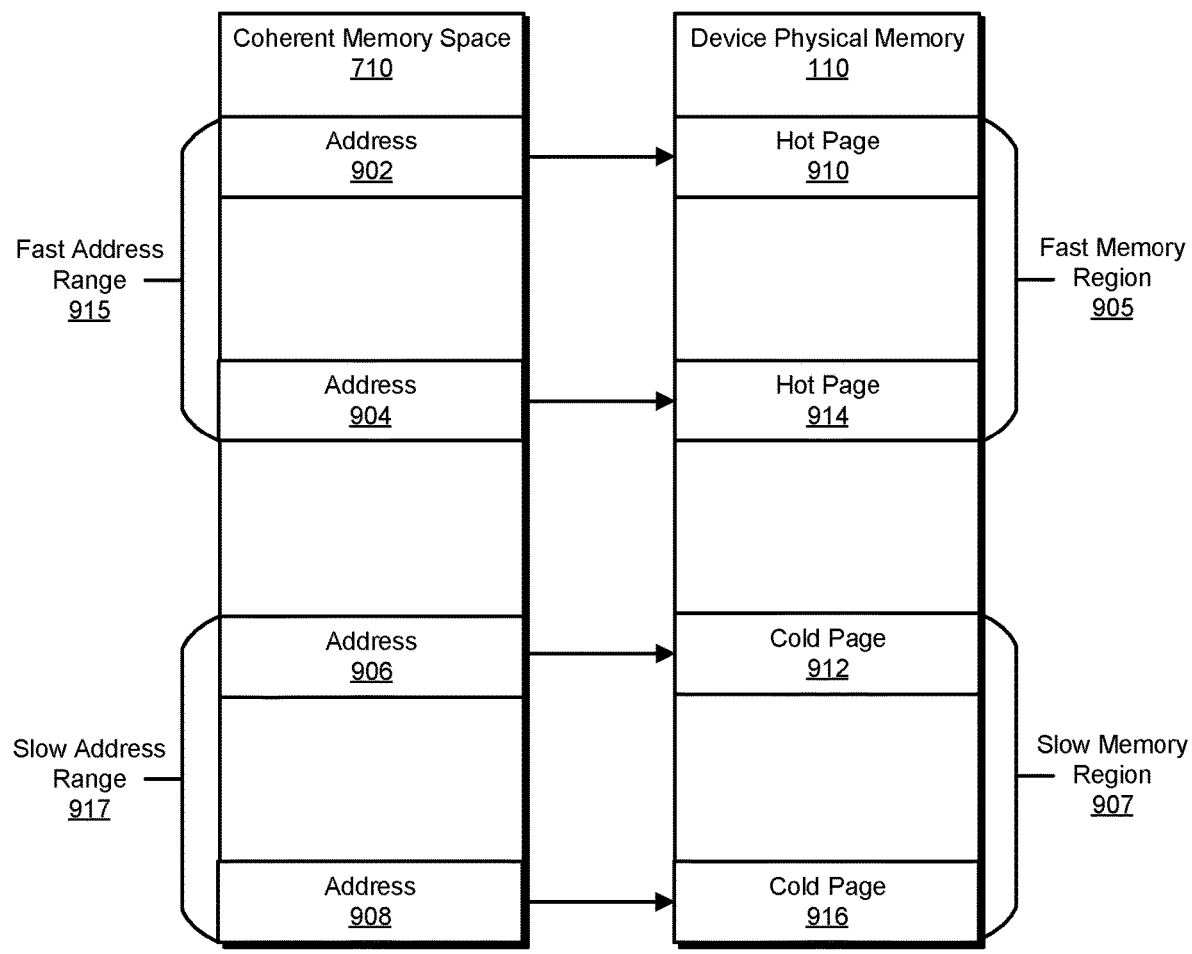
FIG. 15 is a block diagram of the exemplary profiled coherent memory space of FIG. 9 after an exemplary data-migration operation.
Figure 16:
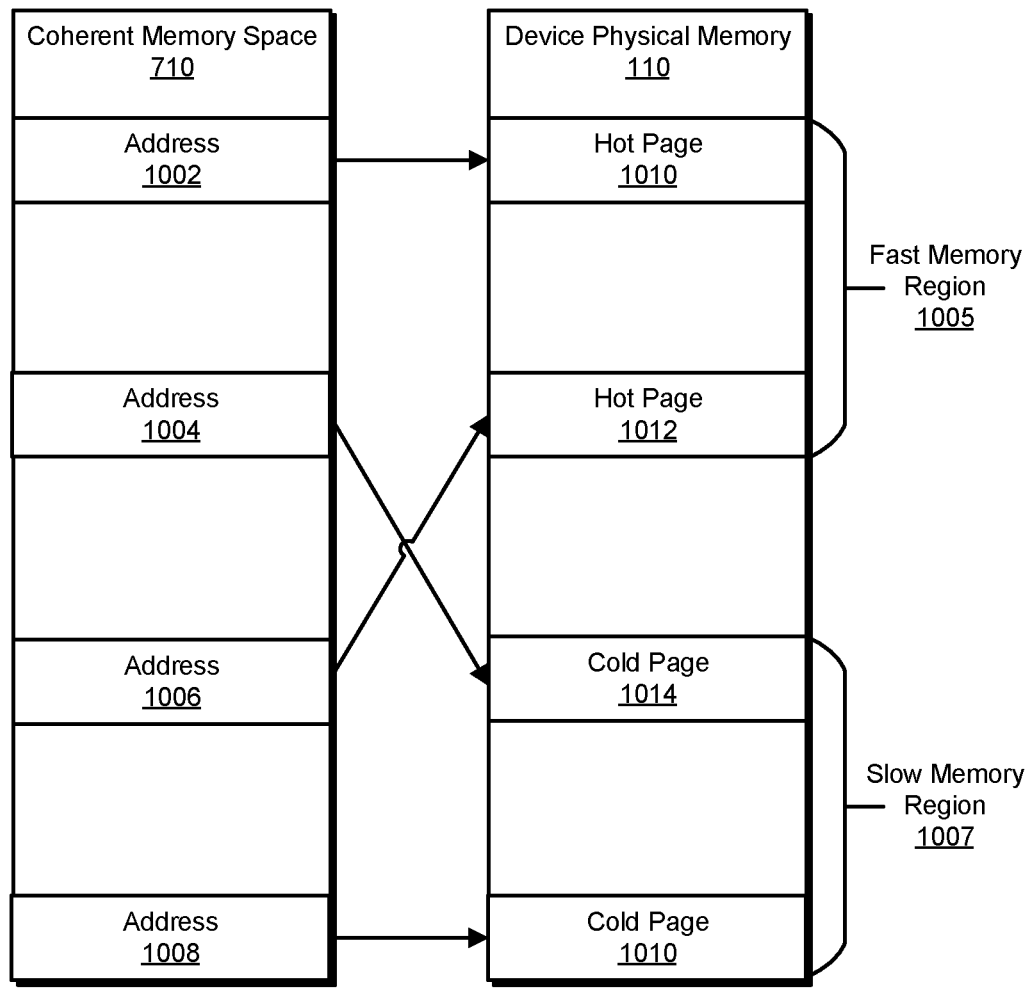
FIG. 16 is a block diagram of the exemplary profiled coherent memory space of FIG. 10 after an exemplary data-migration operation.
Figure 17:
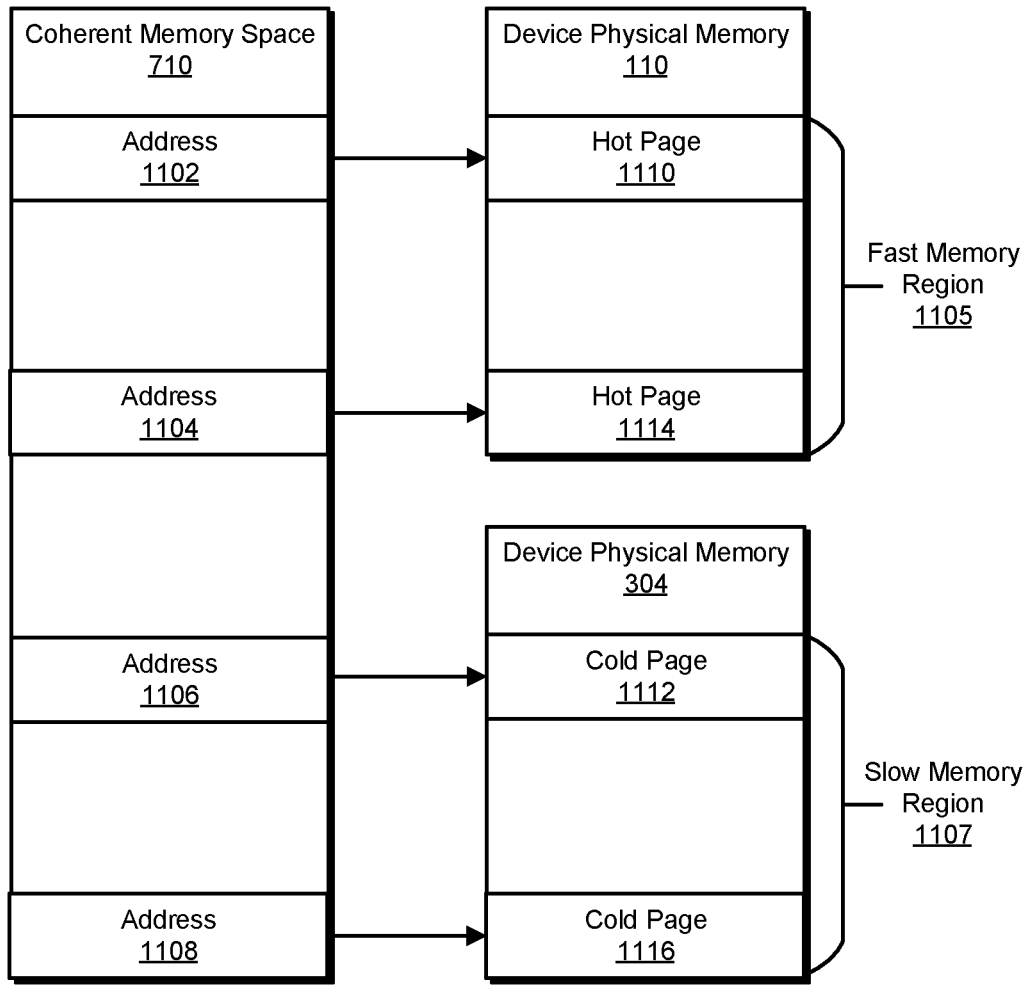
FIG. 17 is a block diagram of the exemplary profiled coherent memory space of FIG. 11 after an exemplary data-migration operation.

FIG. 14 is a flow diagram of an exemplary computer-implemented method 1400 for processing requests to migrate data between host addresses within a coherent memory space. The steps shown in FIG. 14 may be performed by any suitable computer-executable code and/or computing system, including the system(s) illustrated in FIGS. 1, 2, 3, 4, and 5. In one example, each of the steps shown in FIG. 14 may represent an algorithm whose structure includes and/or is represented by multiple sub-steps, examples of which will be provided in greater detail below.

As illustrated in FIG. 14, at step 1410 one or more of the systems described herein may receive, from an external host processor via a cache-coherent interconnect, a request to migrate data. At step 1420, one or more of the systems described herein may perform the migration requested at step 1420 for the external host processor.

In some embodiments, a request to migrate data may be a request to migrate data from one host address to another host address. For example, storage device 108 may receive a request to migrate hot page 914 from a host address 906 (i.e., a slow host address mapped to slow memory region 907) to a host address 904 (i.e., a fast host address mapped to fast memory region 905) and/or a request to migrate cold page 912 from host address 904 to host address 906. Using FIG. 11 as another example, storage device 108 may receive a request to migrate hot page 1114 from a host address 1106 (i.e., a host address mapped to slow memory region 1107 of device physical memory 304) to a host address 1104 (i.e., a host address mapped to fast memory region 1105 of device physical memory 110) and/or a request to migrate cold page 1112 from host address 1104 to host address 1106.

Before migrating data from one host address to another host address, the systems described herein may determine if both host addresses are mapped to local device-attached physical memory. If both host addresses are mapped to local device-attached physical memory, the systems described herein may perform a local migration operation. In some embodiments, the systems described herein may perform a local migration operation by reading data from a physical address corresponding to a copy-from host address and writing the data to a physical address corresponding to a copy-to host address. Using FIGS. 9 and 15 as an example, storage device 108 may migrate hot page 914 from host address 906 to host address 904 by reading hot page 914 from a physical address corresponding to host address 906 and writing hot page 914 to the physical address corresponding to host address 904.

If a copy-from host address is determined to be mapped to a local device-attached physical memory but a copy-to host address is determined to be mapped to a remote memory, the systems described herein may perform a local read operation and a subsequent remote write operation via a cache-coherent interconnect. Using FIGS. 11 and 17 as an example, storage device 108 may migrate cold page 1112 from host address 1104 to host address 1106 by reading cold page 1112 from a local physical address corresponding to host address 1104 and writing cold page 1112 to host address 1106 via cache-coherent bus 116.

If a copy-from host address is determined to be mapped to a remote device-attached physical memory but a copy-to host address is determined to be mapped to a local memory, the systems described herein may perform a remote read operation via a cache-coherent interconnect and a subsequent local write operation. Using FIGS. 11 and 17 as an example, storage device 108 may migrate hot page 1114 from host address 1106 to host address 1104 by reading, via cache-coherent bus 116, hot page 1114 from host address 1106 and writing hot page 1114 to a local physical address corresponding to host address 1104.

In some embodiments, a request to migrate data may be a request to migrate data from one memory region to another memory region without changing the host address of the data. For example, storage device 108 may receive, from host processor(s) 102, a request to migrate hot page 1014 from slow memory region 1007 to fast memory region 1005 and/or a request to migrate cold page 1012 from fast memory region 1005 to slow memory region 1007. In such embodiments, the disclosed systems may remap host addresses to physical addresses after performing a local migration operation. Using FIGS. 10 and 17 as an example, the disclosed systems may remap address 1004 to a physical address in slow memory region 1007 after migrating cold page 1012 from fast memory region 1005 to slow memory region 1007. Similarly, the disclosed systems may remap address 1006 to a physical address in fast memory region 1005 after migrating hot page 1014 from slow memory region 1007 to fast memory region 1005.

As explained above, embodiments of the present disclosure may profile read and write accesses to host-managed device memory and may calculate corresponding access statistics. The disclosed storage devices may provide an interface to external processors to query access statistics and/or may store the access statistics to host-managed device memory such that the external processors may access the statistics through direct memory reads. By providing host processors with access statistics, the systems and methods disclosed herein may enable the host processors to make memory allocation or placement decisions without the computational burdens associated with generating the access statistics. In some embodiments, the systems and methods disclosed herein may manage memory allocation or placement decisions and operations for host processors.

EXAMPLE EMBODIMENTS

Example 1: A computer-implemented method may include (1) receiving, at a storage device via a cache-coherent interconnect, a first request to access data at one or more host addresses of a coherent memory space of an external host processor, (2) updating, in response to the first request, one or more statistics associated with accessing the data at the one or more host addresses, (3) receiving, at the storage device via the cache-coherent interconnect, a second request to perform an operation associated with the one or more statistics, and (4) using the one or more statistics to perform the operation. In Example 1, physical addresses of device-attached physical memory of the storage device may be mapped to the coherent memory space, and the data may be stored to one or more physical addresses of the device-attached physical memory mapped to the one or more host addresses.

Example 2: The computer-implemented method of Example 1, wherein (1) receiving the second request includes receiving, from the external host processor, a request for the one or more statistics and (2) using the one or more statistics to respond to the second request includes transmitting, via the cache-coherent interconnect, the one or more statistics to the external host processor.

Example 3: The computer-implemented method of any of Examples 1-2, further including (1) receiving, from the external host processor via the cache-coherent interconnect, a third request to migrate the data from the one or more host addresses to one or more additional host addresses of the coherent memory space and (2) migrating, by the storage device in response to the third request, the data from the one or more host addresses to the one or more additional host addresses.

Example 4: The computer-implemented method of any of Examples 1-3, wherein (1) the one or more additional host addresses of the coherent memory space are mapped to one or more additional physical addresses of the device-attached physical memory and (2) migrating the data from the one or more host addresses to the one or more additional host addresses may include (a) reading the data from the one or more physical addresses of the device-attached physical memory and (b) writing the data to the one or more additional physical addresses of the device-attached physical memory.

Example 5: The computer-implemented method of any of Examples 1-4, wherein (1) the one or more additional host addresses of the coherent memory space are mapped to one or more additional physical addresses of an additional device-attached physical memory of an additional storage device, the additional storage device being accessible via the cache-coherent interconnect, and (2) migrating the data from the one or more host addresses to the one or more additional host addresses may include (a) reading the data from the one or more physical addresses of the device-attached physical memory and (b) writing, via the cache-coherent interconnect, the data to the one or more additional host addresses.

Example 6: The computer-implemented method of any of Examples 1-5, further including (1) receiving, from the external host processor via the cache-coherent interconnect, a third request to (a) migrate the data from one or more physical addresses of the device-attached physical memory to one or more additional physical addresses of the device-attached physical memory and (b) remap the one or more host addresses to the one or more additional physical addresses of the device-attached physical memory, (2) reading the data from the one or more physical addresses of the device-attached physical memory, (3) writing the data to the one or more additional physical addresses of the device-attached physical memory, and (4) remapping, by the storage device, the one or more host addresses to the one or more additional physical addresses of the device-attached physical memory.

Example 7: The computer-implemented method of any of Examples 1-6, wherein (1) the one or more statistics are stored to one or more additional physical addresses of the device-attached physical memory mapped to one or more additional host addresses of the coherent memory space, (2) updating the one or more statistics associated with accessing the data at the one or more host addresses may include updating the one or more statistics stored to the one or more additional physical addresses of the device-attached physical memory, (3) receiving the second request may include receiving, from the external host processor, a request to read from the one or more additional host addresses, and (4) using the one or more statistics to respond to the second request may include (a) reading the one or more statistics from the one or more additional physical addresses of the device-attached physical memory and (b) transmitting, via the cache-coherent interconnect, the one or more statistics to the external host processor.

Example 8: The computer-implemented method of any of Examples 1-7, wherein (1) receiving the second request may include receiving, from the external host processor, a request for information identifying one or more hot memory pages stored to the device-attached physical memory of the storage device and (2) using the one or more statistics to respond to the second request may include (a) using the one or more statistics to identify the one or more hot memory pages and (b) transmitting, via the cache-coherent interconnect, information identifying the one or more hot memory pages to the external host processor.

Example 9: The computer-implemented method of any of Examples 1-8, wherein (1) receiving the second request may include receiving, from the external host processor, a request for information identifying one or more cold memory pages stored to the device-attached physical memory of the storage device and (2) using the one or more statistics to respond to the second request may include (a) using the one or more statistics to identify the one or more cold memory pages and (b) transmitting, via the cache-coherent interconnect, information identifying the one or more cold memory pages to the external host processor.

Example 10: The computer-implemented method of any of Examples 1-9, wherein (1) receiving the second request may include receiving, from the external host processor, a request for information identifying one or more fast memory regions of the device-attached physical memory of the storage device and (2) using the one or more statistics to respond to the second request may include (a) using the one or more statistics to identify the one or more fast memory regions and (b) transmitting, via the cache-coherent interconnect, information identifying the one or more fast memory regions to the external host processor.

Example 11: The computer-implemented method of any of Examples 1-10, wherein (1) receiving the second request may include receiving, from the external host processor, a request for information identifying one or more slow memory regions of the device-attached physical memory of the storage device and (2) using the one or more statistics to respond to the second request may include (a) using the one or more statistics to identify the one or more slow memory regions and (b) transmitting, via the cache-coherent interconnect, information identifying the one or more slow memory regions to the external host processor.

Example 12: The computer-implemented method of any of Examples 1-11, wherein (1) receiving the second request may include receiving, from the external host processor, a request for information identifying one or more fast host addresses of the coherent memory space and (2) using the one or more statistics to respond to the second request may include (a) using the one or more statistics to identify the one or more fast host addresses and (b) transmitting, via the cache-coherent interconnect, information identifying the one or more fast host addresses to the external host processor.

Example 13: The computer-implemented method of any of Examples 1-12, wherein (1) receiving the second request may include receiving, from the external host processor, a request for information identifying one or more slow host addresses of the coherent memory space and (2) using the one or more statistics to respond to the second request may include (a) using the one or more statistics to identify the one or more slow host addresses and (b) transmitting, via the cache-coherent interconnect, information identifying the one or more slow host addresses to the external host processor.

Example 14: The computer-implemented method of any of Examples 1-13, wherein (1) receiving the second request may include receiving, from the external host processor, a request to migrate one or more hot memory pages to one or more fast memory regions of the device-attached physical memory of the storage device and (2) using the one or more statistics to respond to the second request may include (a) using the one or more statistics to identify the one or more hot memory pages and the one or more fast memory regions and (b) migrating the one or more hot memory pages to the one or more fast memory regions.

Example 15: The computer-implemented method of any of Examples 1-14, wherein (1) receiving the second request may include receiving, from the external host processor, a request to migrate one or more cold memory pages to one or more slow memory regions of the device-attached physical memory of the storage device and (2) using the one or more statistics to respond to the second request may include (a) using the one or more statistics to identify the one or more cold memory pages and the one or more slow memory regions and (b) migrating the one or more cold memory pages to the one or more slow memory regions of the device-attached physical memory of the storage device.

Example 16: A storage device may include (1) device-attached physical memory managed by and accessible to an external host processor via a cache-coherent interconnect, wherein physical addresses of the device-attached physical memory are mapped to a coherent memory space of the external host processor, and (2) one or more internal physical processors adapted to (a) receive, via the cache-coherent interconnect, a first request to access data at one or more host addresses of the coherent memory space, wherein the data are stored to one or more physical addresses of the device-attached physical memory mapped to the one or more host addresses, (b) update, in response to the first request, one or more statistics associated with accessing the data at the one or more host addresses, (c) receive, at the storage device via the cache-coherent interconnect, a second request to perform an operation associated with the one or more statistics, and (d) use the one or more statistics to perform the operation.

Example 17: The storage device of Example 16, wherein the one or more internal physical processors are further adapted to (1) receive, from the external host processor via the cache-coherent interconnect, a third request to migrate the data from the one or more host addresses of the coherent memory space to one or more additional host addresses of the coherent memory space and (2) copy, by the storage device in response to the third request, the data from the one or more host addresses to the one or more additional host addresses.

Example 18: The storage device of any of Examples 16-17, wherein (1) the one or more additional host addresses of the coherent memory space are mapped to one or more additional physical addresses of the device-attached physical memory and (2) the one or more internal physical processors are adapted to migrate the data from the one or more host addresses to the one or more additional host addresses by (a) reading the data from the one or more physical addresses of the device-attached physical memory and (b) writing the data to the one or more additional physical addresses of the device-attached physical memory.

Example 19: The storage device of any of Examples 16-18, wherein (1) the one or more additional host addresses of the coherent memory space are mapped to one or more additional physical addresses of an additional device-attached physical memory of an additional storage device, the additional storage device being accessible via the cache-coherent interconnect and (2) the one or more internal physical processors are adapted to migrate the data from the one or more host addresses to the one or more additional host addresses by (a) reading the data from the one or more physical addresses of the device-attached physical memory and (b) writing, via the cache-coherent interconnect, the data to the one or more additional host addresses.

Example 20: A storage device may include (1) device-attached physical memory managed by and accessible to an external host processor via a cache-coherent interconnect, wherein physical addresses of the device-attached physical memory are mapped to a coherent memory space of the external host processor, and (2) one or more internal physical processors adapted to (a) receive, from the external host processor via the cache-coherent interconnect, a first request to access data at one or more host addresses of the coherent memory space, wherein the data are stored to one or more physical addresses of the device-attached physical memory mapped to the one or more host addresses, (b) update, in response to the first request, one or more statistics associated with accessing the data at the one or more host addresses, (c) receive, from the external host processor via the cache-coherent interconnect, a second request for the one or more statistics, and (d) transmit, in response to the second request, the one or more statistics to the external host processor via the cache-coherent interconnect.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request over a cache-coherent interconnect, transform the request into an access statistic of the request, output the access statistic to device-connected memory, and use the access statistic to respond to future read requests. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of a device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a storage device via a cache-coherent interconnect, a first request to access data via at least one host address of a coherent memory space of an external host processor, the at least one host address having been, mapped to at least one physical address of device-attached physical memory of the storage device;
   accessing, by the storage device, the data via the at least one host address of the coherent memory space of the external host processor by:
      translating, by the storage device, the at least one host address to the at least one physical address of the device-attached physical memory of the storage device; and
      accessing, by the storage device, the data at the at least one physical address of the device-attached physical memory of the storage device;
   updating, by the storage device contemporaneous with accessing the data via the at least one host address of the coherent memory space of the external host processor, one or more statistics associated with accessing the data via the at least one host address of the coherent memory space of the external host processor;
   receiving, at the storage device via the cache-coherent interconnect, a second request to perform an operation associated with the one or more statistics; and
   using the one or more statistics to perform the operation.

2. The computer-implemented method of claim 1, wherein:
   receiving the second request comprises receiving, from the external host processor, a request for the one or more statistics; and
   using the one or more statistics to respond to the second request comprises transmitting, via the cache-coherent interconnect, the one or more statistics to the external host processor.

3. The computer-implemented method of claim 2, further comprising:
   receiving, from the external host processor via the cache-coherent interconnect, a third request to migrate the data from the at least one host address to one or more additional host addresses of the coherent memory space; and
   migrating, by the storage device in response to the third request, the data from the at least one host address to the one or more additional host addresses.

4. The computer-implemented method of claim 3, wherein:
   the one or more additional host addresses of the coherent memory space are mapped to one or more additional physical addresses of the device-attached physical memory; and
   migrating the data from the at least one host address to the one or more additional host addresses comprises:
      reading the data from the at least one physical address of the device-attached physical memory; and
      writing the data to the one or more additional physical addresses of the device-attached physical memory.

5. The computer-implemented method of claim 3, wherein:
   the one or more additional host addresses of the coherent memory space are mapped to one or more additional physical addresses of an additional device-attached physical memory of an additional storage device, the additional storage device being accessible via the cache-coherent interconnect; and
   migrating the data from the at least one host address to the one or more additional host addresses comprises:
      reading the data from the at least one physical address of the device-attached physical memory; and
      writing, via the cache-coherent interconnect, the data to the one or more additional host addresses.

6. The computer-implemented method of claim 2, further comprising:
   receiving, from the external host processor via the cache-coherent interconnect, a third request to:
      migrate the data from the at least one physical address of the device-attached physical memory to one or more additional physical addresses of the device-attached physical memory; and
      remap the at least one host address to the one or more additional physical addresses of the device-attached physical memory;
   reading the data from the at least one physical address of the device-attached physical memory;
   writing the data to the one or more additional physical addresses of the device-attached physical memory; and
   remapping, by the storage device, the at least one host address to the one or more additional physical addresses of the device-attached physical memory.

7. The computer-implemented method of claim 1, wherein:
- the one or more statistics are stored to one or more additional physical addresses of the device-attached physical memory mapped to one or more additional host addresses of the coherent memory space;
- updating the one or more statistics associated with accessing the data at the at least one host address comprises updating the one or more statistics stored to the one or more additional physical addresses of the device-attached physical memory;
- receiving the second request comprises receiving, from the external host processor, a request to read from the one or more additional host addresses; and
- using the one or more statistics to respond to the second request comprises:
  - reading the one or more statistics from the one or more additional physical addresses of the device-attached physical memory; and
  - transmitting, via the cache-coherent interconnect, the one or more statistics to the external host processor.

8. The computer-implemented method of claim 1, wherein:
- receiving the second request comprises receiving, from the external host processor, a request for information identifying one or more hot memory pages stored to the device-attached physical memory of the storage device; and
- using the one or more statistics to respond to the second request comprises:
  - using the one or more statistics to identify the one or more hot memory pages; and
  - transmitting, via the cache-coherent interconnect, information identifying the one or more hot memory pages to the external host processor.

9. The computer-implemented method of claim 1, wherein:
- receiving the second request comprises receiving, from the external host processor, a request for information identifying one or more cold memory pages stored to the device-attached physical memory of the storage device; and
- using the one or more statistics to respond to the second request comprises:
  - using the one or more statistics to identify the one or more cold memory pages; and
  - transmitting, via the cache-coherent interconnect, information identifying the one or more cold memory pages to the external host processor.

10. The computer-implemented method of claim 1, wherein:
- receiving the second request comprises receiving, from the external host processor, a request for information identifying one or more fast memory regions of the device-attached physical memory of the storage device; and
- using the one or more statistics to respond to the second request comprises:
  - using the one or more statistics to identify the one or more fast memory regions; and
  - transmitting, via the cache-coherent interconnect, information identifying the one or more fast memory regions to the external host processor.

11. The computer-implemented method of claim 1, wherein:
- receiving the second request comprises receiving, from the external host processor, a request for information identifying one or more slow memory regions of the device-attached physical memory of the storage device; and
- using the one or more statistics to respond to the second request comprises:
  - using the one or more statistics to identify the one or more slow memory regions; and
  - transmitting, via the cache-coherent interconnect, information identifying the one or more slow memory regions to the external host processor.

12. The computer-implemented method of claim 1, wherein:
- receiving the second request comprises receiving, from the external host processor, a request for information identifying one or more fast host addresses of the coherent memory space; and
- using the one or more statistics to respond to the second request comprises:
  - using the one or more statistics to identify the one or more fast host addresses; and
  - transmitting, via the cache-coherent interconnect, information identifying the one or more fast host addresses to the external host processor.

13. The computer-implemented method of claim 1, wherein:
- receiving the second request comprises receiving, from the external host processor, a request for information identifying one or more slow host addresses of the coherent memory space; and
- using the one or more statistics to respond to the second request comprises:
  - using the one or more statistics to identify the one or more slow host addresses; and
  - transmitting, via the cache-coherent interconnect, information identifying the one or more slow host addresses to the external host processor.

14. The computer-implemented method of claim 1, wherein:
- receiving the second request comprises receiving, from the external host processor, a request to migrate one or more hot memory pages to one or more fast memory regions of the device-attached physical memory of the storage device; and
- using the one or more statistics to respond to the second request comprises:
  - using the one or more statistics to identify the one or more hot memory pages and the one or more fast memory regions; and
  - migrating the one or more hot memory pages to the one or more fast memory regions.

15. The computer-implemented method of claim 1, wherein:
- receiving the second request comprises receiving, from the external host processor, a request to migrate one or more cold memory pages to one or more slow memory regions of the device-attached physical memory of the storage device; and
- using the one or more statistics to respond to the second request comprises:
  - using the one or more statistics to identify the one or more cold memory pages and the one or more slow memory regions; and
  - migrating the one or more cold memory pages to the one or more slow memory regions of the device-attached physical memory of the storage device.

16. A storage device comprising:
device-attached physical memory managed by and accessible to an external host processor via a cache-coherent interconnect, wherein physical addresses of the device-attached physical memory are mapped to a coherent memory space of the external host processor; and
one or more internal physical processors adapted to:
  receive, via the cache-coherent interconnect, a first request to access data via at least one host address of the coherent memory space, the at least one host address having been mapped to at least one physical address of the device-attached physical memory of the storage device;
  access the data via the at least one host address of the coherent memory space of the external host processor by:
    translating the at least one host address to the at least one physical address of the device-attached physical memory of the storage device; and
    accessing the data at the at least one physical address of the device-attached physical memory of the storage device;
  update, contemporaneous with accessing the data via the at least one host address of the coherent memory space of the external host processor, one or more statistics associated with accessing the data via the at least one host address of the coherent memory space of the external host processor;
  receive, at the storage device via the cache-coherent interconnect, a second request to perform an operation associated with the one or more statistics; and
  use the one or more statistics to perform the operation.

17. The storage device of claim 16, wherein the one or more internal physical processors are further adapted to:
  receive, from the external host processor via the cache-coherent interconnect, a third request to migrate the data from the at least one host address of the coherent memory space to one or more additional host addresses of the coherent memory space; and
  copy, by the storage device in response to the third request, the data from the at least one host address to the one or more additional host addresses.

18. The storage device of claim 17, wherein:
the one or more additional host addresses of the coherent memory space are mapped to one or more additional physical addresses of the device-attached physical memory; and
the one or more internal physical processors are adapted to migrate the data from the at least one host address to the one or more additional host addresses by:
  reading the data from the at least one physical address of the device-attached physical memory; and
  writing the data to the one or more additional physical addresses of the device-attached physical memory.

19. The storage device of claim 17, wherein:
the one or more additional host addresses of the coherent memory space are mapped to one or more additional physical addresses of an additional device-attached physical memory of an additional storage device, the additional storage device being accessible via the cache-coherent interconnect; and
the one or more internal physical processors are adapted to migrate the data from the at least one host address to the one or more additional host addresses by:
  reading the data from the at least one physical address of the device-attached physical memory; and
  writing, via the cache-coherent interconnect, the data to the one or more additional host addresses.

20. A storage device comprising:
device-attached physical memory managed by and accessible to an external host processor via a cache-coherent interconnect, wherein physical addresses of the device-attached physical memory are mapped to a coherent memory space of the external host processor; and
one or more internal physical processors adapted to:
  receive, from the external host processor via the cache-coherent interconnect, a first request to access data via at least one host address of the coherent memory space, the at least one host address having been mapped to at least one physical address of device-attached physical memory of the storage device;
  access the data via the at least one host address of the coherent memory space of the external host processor by:
    translating the at least one host address to the at least one physical address of the device-attached physical memory of the storage device; and
    accessing the data at the at least one physical address of the device-attached physical memory of the storage device;
  update, contemporaneous with accessing the data via the at least one host address of the coherent memory space of the external host processor, one or more statistics associated with accessing the data via the at least one host address of the coherent memory space of the external host processor;
  receive, from the external host processor via the cache-coherent interconnect, a second request for the one or more statistics; and
  transmit, in response to the second request, the one or more statistics to the external host processor via the cache-coherent interconnect.

* * * * *